UNITED STATES PATENT OFFICE.

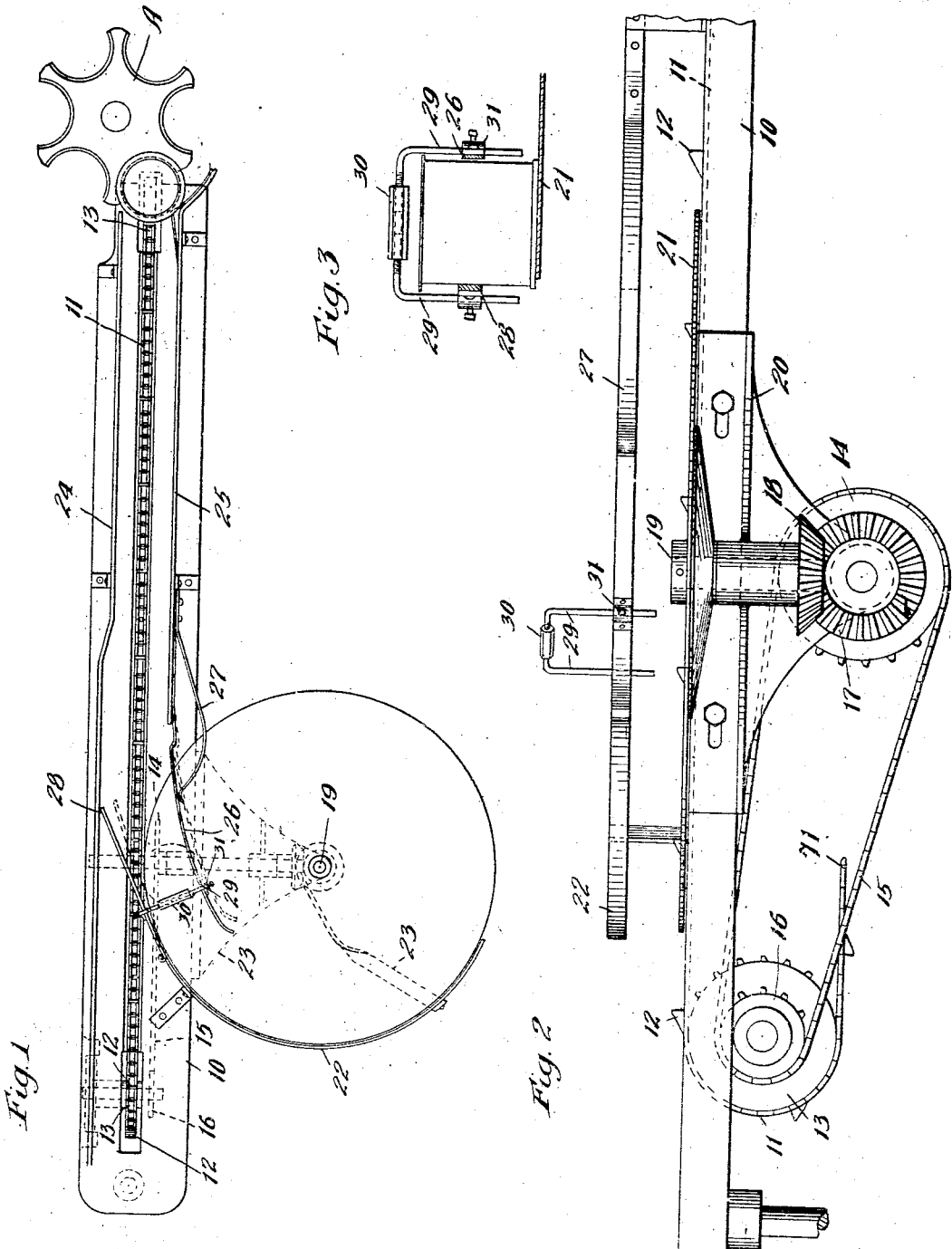

AUGUST M. AUGENSEN, OF MAYWOOD, ILLINOIS, ASSIGNOR TO SANITARY CAN COMPANY, OF NEW YORK, N. Y., A CORPORATION OF NEW YORK.

CAN-BODY-FEEDING DEVICE.

1,122,242. Specification of Letters Patent. Patented Dec. 29, 1914.

Application filed May 13, 1912. Serial No. 696,896.

*To all whom it may concern:*

Be it known that I, AUGUST M. AUGENSEN, a citizen of the United States, residing in Maywood, in the county of Cook and State of Illinois, have invented a new and useful Improvement in Can-Body-Feeding Devices, of which the following is a specification.

This invention relates to improvements in feeding devices such as are adapted for use particularly with conveyers for can bodies or similar articles.

The object of the invention is to provide a simple construction which will insure the proper and timely feeding of can bodies or other articles as they are transferred from one member to another, one or both of which may be moving, and which will prevent the jamming or clogging of the machine, and also prevent distortion or denting in of the article being fed.

Hitherto, it has been customary to have firm or rigid guard rails or guides to direct the can bodies as the same are transferred from one member to another, and the engaging fingers or lugs on one of the can body propelling members oftentimes engage the can body at the wrong angle and clamp or jam the can body against the stationary guard rails or guides instead of rolling them along said rails as is the proper operation, and as will be apparent, this causes the can bodies to be dented in or distorted and the true cylindrical contour thereof broken, which renders the cans unfit for further use, since the covers or heads cannot be properly applied.

I have devised a structure wherein one or more yieldingly mounted members are used, which take care of any abnormal conditions during the transferring operation of the can bodies from one conveyer or table to another, and which prevents distortion or injury to the can bodies or to the machine.

My invention furthermore consists in the improvements in the parts and devices and in the novel combination of parts and devices herein shown, described or claimed.

In the drawing forming a part of this specification, Figure 1 is a plan view of a structure embodying my improvements. Fig. 2 is a broken side elevation, upon a somewhat enlarged scale, of the structure shown in Fig. 1, and Fig. 3 is a detail view of a portion of the device.

In the drawings, 10 denotes a table or platform or frame which may be of any suitable construction, and over which is adapted to run an endless conveyer or belt 11, adapted to propel can bodies to a seaming machine, filling machine or other suitable mechanism A for operating on can bodies, and which is provided with a plurality of spaced fingers or flights 12. This conveyer is mounted on suitable sprocket gears 13, 13, at the ends of the bed or table and as shown more clearly in Fig. 2, a third sprocket gear 14 is driven by means of a belt or chain 15 from sprocket gear 16, mounted on the same shaft as one of the sprocket gears 13. Mounted on the same shaft as that on which the sprocket gear 14 is mounted is a bevel gear 17, meshing with a second bevel gear 18, secured to the lower end of a vertical shaft 19, mounted in a supporting bracket 20, which is adjustably secured to the bed or frame 10. Keyed to the upper end of the shaft 19, in any suitable manner, is a rotatable table or disk 21 on which the can bodies or other articles may be placed either by hand or fed thereonto by means of a suitable conveyer (not shown). Extending around one side of the rotatable table 21 is a curved guide or guard 22, the same being suitably supported by means of brackets 23, 23. Secured to the table 10 and disposed alongside the conveyer 11 are guard or guide rails 24, 25, as is customary in this type of conveyer. Secured to the end of the guard rail 25 adjacent the table 21 is a spring arm 26, the same being yieldingly held in position by means of a leaf spring 27 also preferably secured to the rail 25. Pivoted at one end of the curved guide 22 is a swinging arm 28 which is limited in its movements in one direction by the guard rail 24, as will be apparent from an inspection of Fig. 1. The swinging arm 28 and spring arm 26 are attached to each other by means of an inverted U-shaped member, the same being composed of two members 29, 29, threaded at their upper inner ends and adjustable relatively to each other by means of the turnbuckle 30. Each of the members 29, 29 is also preferably mounted adjustably in brackets 31, 31 secured to the arms 28 and 26. By means of the turn buckle arrangement, the distance between the arms 26 and 28 may be varied to accommodate can bodies or other articles of different widths, and the U-shaped member may also be adjusted vertically in accordance with the heights of the can bodies being fed. The can bodies, after being fed onto the table 21 will be guided into the passageway formed between the arms 26, 28, and will then be engaged by the fingers or flights 12 of the conveyer and pushed or propelled thereby along the top of the table or bed 10 to the seaming machine A. Hitherto, where the arm or guide 26 has been made or formed of a rigid construction, the fingers 12 in engaging the can bodies oftentimes engage the can bodies at such an angle that they press the can body directly against the arm or guide instead of causing the can bodies to roll, and this results in serious damage to the can bodies, since it distorts and dents them in. But by providing yieldingly mounted arms when the fingers 12 engage the can bodies at an improper angle, the guide rail yields and allows the finger to pass by the can body and immediately thereafter the spring 27 will cause the arm 26 and the swinging arm 28, which moves in unison therewith, to push the can in proper position to be engaged by the succeeding finger on the conveyer 11.

It will be apparent to those skilled in the art that my improvements are not limited to a structure in which a rotatable table is used in connection with an endless conveyer, but that the improvements may be applied on other forms of feeding mechanisms without departing from the spirit of the invention, and all changes and variations are contemplated as fall within the scope of the claims appended hereto.

I claim:—

1. In a feeding device of the class described, in combination, a conveyer adapted to propel can bodies and the like, a rotatable table arranged to hold the can bodies in indefinite relation to the said propelling conveyer, and a guide for directing the articles being fed from the table to the conveyer, said guide comprising two spaced members movable in unison, one of said members being pivotally mounted and the other having its free end yieldingly controlled.

2. In a feeding device of the class described, in combination, a conveyer adapted to propel can bodies and the like, a rotatable table arranged to hold the can bodies in indefinite relation to the said propelling conveyer, and a guide for directing the articles being fed from the table to the conveyer, said guide comprising two spaced members movable in unison, one of said members being pivotally mounted and the other having its free end yieldingly controlled, and means for adjusting the distance between the two members.

3. In a feeding device of the class described, in combination, a conveyer adapted to propel can bodies and the like along a horizontal track, a table rotatable in a horizontal plane, and arranged to hold the can bodies in indefinite relation to the said propelling conveyer, and means for guiding the articles being fed, said means including a yielding mounted member located adjacent the conveyer and arranged at an angle thereto.

4. In a feeding device of the class described, in combination, a movable member adapted to propel can bodies and the like, a table adjacent thereto arranged to hold the can bodies in indefinite relation to the said propelling conveyer, and means for guiding articles from one to the other, said means including a pair of spaced members movable in unison and adapted to have an oscillating movement, and one of said members being yieldingly controlled.

5. In a feeding device of the class described, in combination, a movable member adapted to propel can bodies and the like, a table adjacent thereto arranged to hold the can bodies in indefinite relation to the said propelling conveyer, and means for guiding articles being fed from the table to be engaged by the propelling member, said means including a yieldingly mounted guideway located adjacent the movable member and through which the articles pass, substantially as specified.

6. In a feeding device of the class described, in combination, two movable elements, one of which is adapted to propel can bodies and the like, and the other of which is arranged to hold the can bodies in indefinite relation to the first movable element, and means for guiding the articles being fed from one of said elements to the other, said means comprising two guide arms, one of which has a spring arm.

7. In a feeding device of the class described, in combination, a movable member adapted to propel can bodies and the like, a supporting table adjacent thereto arranged to hold the can bodies in indefinite relation to the said propelling conveyer, and means for guiding the articles being fed from one to the other comprising a pivotally mounted arm and a spring arm.

8. In a feeding device of the class described, in combination, a movable member adapted to propel can bodies and the like, a supporting table adjacent thereto arranged to hold the can bodies in indefinite relation to the said propelling conveyer, and means for guiding the articles being fed from one to the other comprising a pivotally mounted arm and a spring arm, said arms being movable in unison.

9. In a feeding device of the class described, in combination, an endless conveyer provided with a plurality of spaced fingers adapted to propel can bodies and the like, a rotary horizontal table adjacent said conveyer and arranged to hold the can bodies in indefinite relation to the said spaced fingers, and means for guiding the can bodies or other articles being fed from the table to the conveyer, said means comprising a pivotally mounted arm and a spring arm, said arms being spaced and adapted to move in unison and being adjustable relatively to each other.

10. A can feeding device of the character described including, in combination: a horizontal table; and a propelling conveyer adjacent to said table, the table being arranged to support the can bodies in indefinite relation to the propelling elements of the said conveyer; and means for guiding cans as they pass from the table to the conveyer arranged to prevent jamming of the cans, said means including a yieldable, movable guideway through which the cans pass and which extends from a point over the table to a point adjacent the conveyer, substantially as specified.

AUGUST M. AUGENSEN.

Witnesses:
PEARL ABRAMS,
ESTHER ABRAMS.